(12) United States Patent
Benedetto

(10) Patent No.: US 12,145,055 B2
(45) Date of Patent: Nov. 19, 2024

(54) PASS-THROUGH DEVICE FOR CLOUD GAMING AND METHODS FOR PROCESSING

(71) Applicant: Sony Interactive Entertainment Inc., Tokyo (JP)

(72) Inventor: Warren M. Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 274 days.

(21) Appl. No.: 17/355,077

(22) Filed: Jun. 22, 2021

(65) Prior Publication Data
US 2022/0401834 A1    Dec. 22, 2022

(51) Int. Cl.
| | |
|---|---|
| A63F 13/355 | (2014.01) |
| A63F 13/235 | (2014.01) |
| A63F 13/358 | (2014.01) |
| A63F 13/533 | (2014.01) |
| H04L 67/10 | (2022.01) |

(52) U.S. Cl.
CPC .......... *A63F 13/355* (2014.09); *A63F 13/235* (2014.09); *A63F 13/358* (2014.09); *A63F 13/533* (2014.09); *H04L 67/10* (2013.01); *A63F 2300/1031* (2013.01); *A63F 2300/308* (2013.01); *A63F 2300/534* (2013.01); *A63F 2300/538* (2013.01)

(58) Field of Classification Search
CPC .... A63F 13/355; A63F 13/235; A63F 13/358; A63F 13/533; H04L 67/10
See application file for complete search history.

(56) References Cited

U.S. PATENT DOCUMENTS

| | | | |
|---|---|---|---|
| 8,144,182 B2 * | 3/2012 | Shoemake | H04N 21/4788 348/14.09 |
| 9,055,066 B2 * | 6/2015 | Kim | H04L 65/612 |
| 2010/0166058 A1 | 7/2010 | Perlman et al. | |

(Continued)

OTHER PUBLICATIONS

PCT/US2022/030540, Notification of Transmittal of the International Search Report and the Written Opinion of the International Searching Authority, or the Declaration, PCT/ISA/220, and the International Search Report, PCT/ISA/210, Sep. 9, 2022.

(Continued)

*Primary Examiner* — Yingchuan Zhang
(74) *Attorney, Agent, or Firm* — Penilla IP, APC

(57) ABSTRACT

Methods and systems are provided for processing video games streamed from a cloud gaming system over a network. The method includes receiving an indication of selection of the video game, for a gaming session, through a user interface associated with a streaming device that is connected to a display screen via a pass-through device. The method includes receiving a signal that the gaming session is active, from a game streaming logic of the pass-through device. In one embodiment, the game streaming logic is configured to receive a compressed stream of the video game, decode the compressed stream of the video game, and provide image data for rendering by the display screen, and receiving user input by the game streaming logic for driving interactivity of the video game while said cloud gaming system executes said video game.

6 Claims, 10 Drawing Sheets

(56) References Cited

U.S. PATENT DOCUMENTS

2014/0173675 A1* 6/2014 Ahmed .................. H04L 67/02
                                                                725/116
2014/0331265 A1   11/2014 Mozell et al.
2015/0289028 A1   10/2015 Perlman et al.
2017/0050111 A1*  2/2017 Perry ................... H04L 67/131
2017/0180899 A1   6/2017 Proctor, Jr. et al.
2018/0256975 A1   9/2018 Perlman et al.
2019/0058958 A1   2/2019 Proctor, Jr. et al.
2019/0321732 A1* 10/2019 Zimring ................ A63F 13/355
2020/0206618 A1   7/2020 Perlman et al.

OTHER PUBLICATIONS

Various: "Xbox One—Wikipedia, the free encyclopedia", XP055228120, Sep. 3, 2014, https://en.wikipedia.org/w/index.php?title=Xbox_One&oldid=623968920.

* cited by examiner

PASS-THROUGH DEVICE FOR CLOUD GAMING AND METHODS FOR PROCESSING

BACKGROUND

1. Field of the Disclosure

The present disclosure relates generally to streaming video games, and more particularly to methods and systems for processing video games streamed from a cloud gaming system over a network.

2. Description of the Related Art

The video game industry has seen many changes over the years. In particular, technology related to cloud gaming is improving and changing the way video games are played, distributed, and sold. Today, cloud gaming systems allow players to access and play video games over a network without having to download the video game onto any game console or device. In contrast to traditional gaming means where a video game runs locally on the player's video game console, cloud gaming systems do not require expensive video game consoles or powerful computers to execute the video game. Instead, cloud gaming systems can video games on remote servers and stream them directly to the player's device. To this end, developers have been seeking ways to develop sophisticated operations that can improve cloud gaming.

A growing trend in the video game industry is to improve and develop unique ways that will improve cloud gaming systems and to provide an efficient way for players to access cloud gaming With the rise in popularity of third-party streaming devices such as Apple™ TV, Roku™ streaming media player, Amazon™ Fire TV Stick, Google™ Chromecast™, etc., the streaming devices may provide access to various media content, however, the streaming devices may not support and facilitate cloud gaming. For example, a consumer can use their Roku™ streaming media player to stream various media content and to access a limited number of video games. Unfortunately, Roku™ streaming media players and other streaming devices may not be able to support cloud gaming which requires very low-latency video decoding and high processing power to effectively decode the video game stream. Since traditional streaming devices have a limited processing power, the streaming devices are unable to effectively decode the high-quality video game streams that are transmitted from the cloud gaming system. As a result, cloud gaming may not be accessible for consumers who may wish to access video games from a cloud gaming system through their streaming device.

It is in this context that implementations of the disclosure arise.

SUMMARY

Implements for the present disclosure include methods, systems, and devices relating to processing video games streamed from a cloud gaming system over a network. In one embodiment, a pass-through device can be integrated with a streaming device (e.g., Apple™ TV, Roku™ streaming media player, Amazon™ Fire TV Stick, Google™ Chromecast™, etc.) of a user to provide the user with access to video games on the cloud gaming system. In this way, the streaming device of the user does not need to be modified with any customized hardware or software integrations. With a pass-through device connected to a streaming device of the user, the user can quickly access cloud gaming through a user interface of the streaming device. In some embodiments, users may continue to use their preferred streaming device and its corresponding user interface for accessing various streaming entertainment services (e.g., Netflix™, Hulu™, Amazon™ Prime Video, YouTube™, etc.) and also video games from a cloud gaming system.

Accordingly, users can seamlessly switch between viewing media content and cloud gaming in an efficient manner using a pass-through device that is connected to their preferred streaming device. In some embodiments, various operations that are required for cloud gaming is supported and can be performed by the pass-through device rather than the streaming device. For example, the pass-through device may include operations that can facilitate low-latency video decoding, high processing power, wireless connection to devices via Bluetooth, wireless connection to a cloud gaming server, controller input and video frames processing at low-latency, providing video frames for rendering by a video display device, etc.

In one embodiment, a method for processing video games streamed from a cloud gaming system over a network is provided. The method includes receiving an indication of selection of the video game, for a gaming session, through a user interface associated with a streaming device that is connected to a display screen via a pass-through device. The method includes receiving a signal that the gaming session is active, from a game streaming logic of the pass-through device. In one embodiment, the game streaming logic is configured to receive a compressed stream of the video game, decode the compressed stream of the video game, and provide image data for rendering by the display screen, and receiving user input by the game streaming logic for driving interactivity of the video game while said cloud gaming system executes said video game.

In another embodiment, pass-through device for streaming a video game from a cloud gaming system over a network is provided. The pass-through device includes an HDMI output port. The pass-through device includes an HDMI input port. The pass-through device includes a pass-through logic. The pass-through device includes a game streaming logic. The game streaming logic is configured to receive a compressed stream of the video game, decode the compressed stream of the video game, and provide image data for rendering by the display screen.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
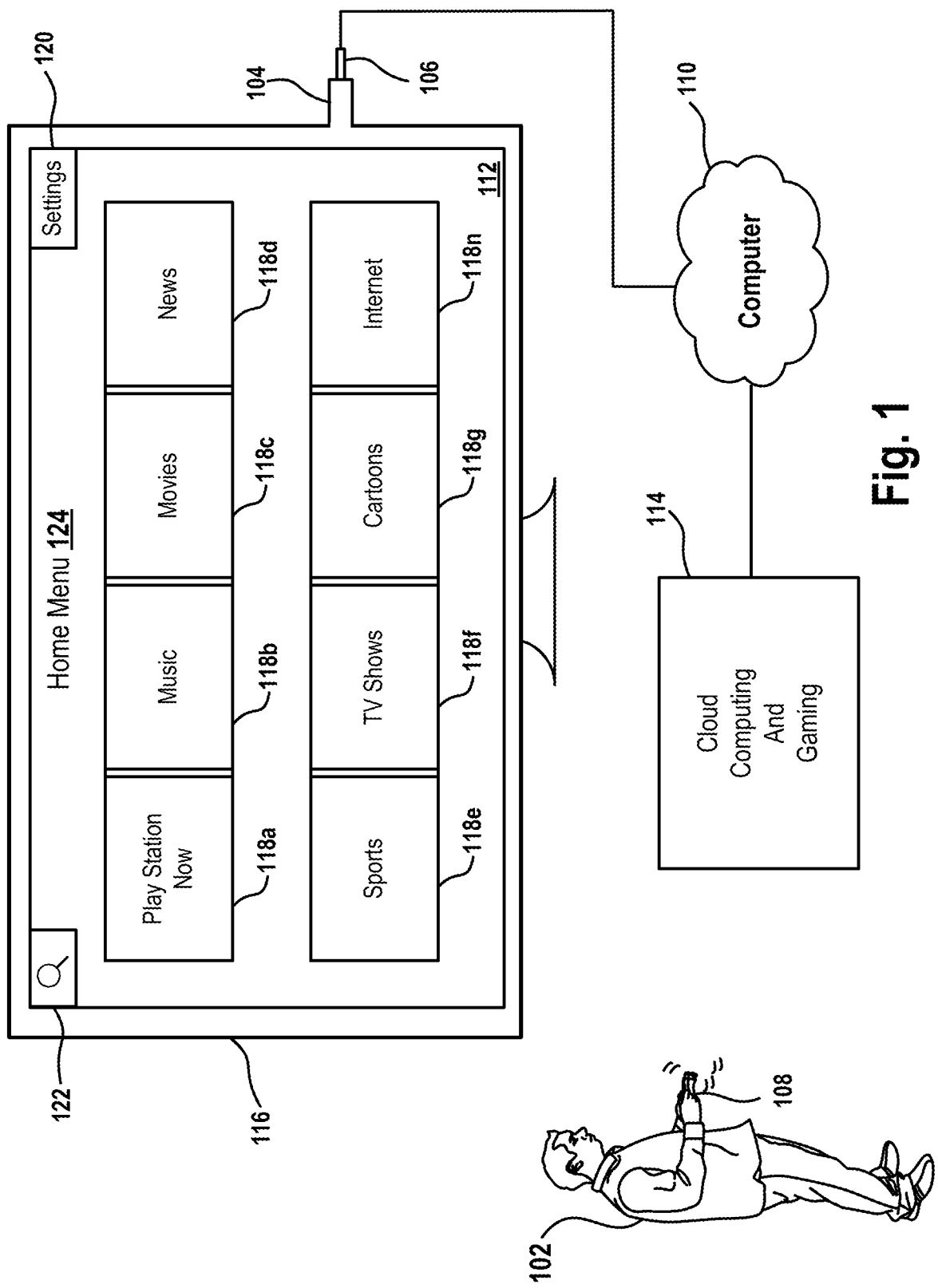
FIG. 1 illustrates an embodiment of a system that is configured to stream video games from a cloud computing and gaming provider and media content from an entertainment services provided to a user using a streaming device that is connected to a display screen via a pass-through device, in accordance with an implementation of the disclosure.

The following implementations of the present disclosure provide methods, systems, and devices for processing video games streamed from a cloud gaming system over a network. In one embodiment, a pass-through device can be integrated with a streaming device (e.g., Apple™ TV, Roku™ streaming media player, Amazon™ Fire TV Stick, Google™ Chromecast™, etc.) of a user to provide the user with access to video games on the cloud gaming system. In one embodiment, since the pass-through device and the streaming device are connected to each other, the devices can work together to provide a user with access to cloud gaming from a cloud gaming system and media content from various streaming entertainment services (e.g., Netflix™, Hulu™, Amazon™ Prime Video, YouTube™, etc.). This facilitates a seamless way for consumers to stream video games from the cloud gaming system without abandoning their preferred streaming device. For example, a user may own a Roku™ streaming media player that is used for streaming media content from various entertainment services. In order to access video games from a cloud gaming system, the user can simply connect a pass-through device to their Roku streaming media player.

In one embodiment, the pass-through device can be activated by selecting a video game or an application associated with the video game (e.g., PlayStation™ Now application) through a user interface associated with the Roku streaming media player. Once the video game is selected, a gaming session is active and the pass-through device is configured to receive a compressed stream of the video game for decoding and displaying on a display screen of the user. Generally, the methods described herein provides a way for integrating a pass-through device with a streaming device of the user so that cloud gaming can be accessible without any hardware or software modifications to the streaming device of the user.

By way of example, a method is disclosed that enables a method for processing video games streamed from a cloud gaming system over a network. The method includes receiving an indication of selection of the video game, for a gaming session, through a user interface associated with a streaming device that is connected to a display screen via a pass-through device. In one example, a user may be watching a movie on their Roku™ streaming device. After the movie is over, the user may have a desire to play a video game on the cloud gaming system. To initiate a gaming session, the user can select a video game on an interface of the Roku™ streaming device to begin the gameplay.

In another embodiment, the method may further include receiving a signal that the gaming session is active, from a game streaming logic of the pass-through device. In one example, the game streaming logic is configured to receive a compressed stream of the video game, decode the compressed stream of the video game, and provide image data for rendering by the display screen, and receiving user input by the game streaming logic for driving interactivity of the video game while said cloud gaming system executes said video game. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for streaming online video games to users over a network from a cloud gaming system. In one embodiment, the system includes a streaming device that is connected to a display screen via a pass-through device. In one embodiment, pass-through device may provide a user with access to cloud gaming. For example, when the pass-through device is not activated, a user can stream and watch media content from any of the entertainment streaming services (e.g., Netflix™, Hulu™, Amazon™ Prime™ Video™, YouTube™, etc.) that are available through the streaming device. To activate and enable the pass-through device for cloud gaming, the user can select a video game or an application associated with the video game through a user interface of the streaming device.

In one embodiment, when the pass-through device is activated, the user can access and play a plurality of video games that are available on the cloud gaming system. In some embodiments, the pass-through device is configured to perform a plurality of operations that can facilitate cloud gaming such as receiving a compressed stream of the video game, decoding of the compressed stream of the video game, providing image data for rendering by the display screen, receiving user input for driving interactivity of the video game, etc. In this way, users can use the pass-through device for cloud gaming while allowing users to continue using their streaming device for streaming media content from various streaming entertainment services.

With the above overview in mind, the following provides several example figures to facilitate understanding of the example embodiments.

FIG. 1 illustrates an embodiment of a system that is configured to stream video games from a cloud computing and gaming provider 114 and media content from an entertainment services provider to a user 102 using a streaming device 106 that is connected to a display screen 116 via a pass-through device 104. In one embodiment, FIG. 1 illustrates a user 102, a pass-through device 104, a streaming device 106, a network 110, a cloud computing and gaming provider 114, and a display screen 116. As illustrated in FIG. 1, a user 102 is shown using a controller 108 to explore various features on a user interface 112 associated with the streaming device 106. In some embodiments, the user interface 112 can be displayed on a mobile device of the other or any other device such as a personal computer, a laptop, a tablet computer, a monitor and console/PC setup, a television and console setup, a peripheral device, a tablet, a thin client, a set-top box, a network device/appliance, etc.

In one embodiment, the streaming device 106 is wirelessly connected to an entertainment services provider (not shown) over the network 110. In some embodiments, the entertainment services provider can stream and provide the user with access to a plurality of media content. For example, the streaming device 106 may be a media streaming device such as an Apple™ TV, a Roku™ streaming media player, an Amazon™ Fire TV Stick, a Google™ Chromecast™, etc. Each streaming device 106 may offer different entertainment services and provide a user with a different user interface.

For example, in one embodiment, as illustrated in FIG. 1, the user interface 112 of the streaming device 106 may include a plurality of applications for accessing different types of streaming entertainment services. As illustrated, a home menu 124 may include various applications 118*a*-118*n* that can be accessed by the user 102. The home menu 124 includes a PlayStation Now application 118*a*, a music application 118*b*, a movies application 118*c*, a news application 118*d*, a sports application 118*e*, a TV shows application 118*f*, a cartoons application 118*g*, and an Internet application 118*n*. In one embodiment, the user interface 112 may include a search 122 feature that allows the user 102 to quickly search for particular application, media content, or video game. In other embodiments, the user interface 112 may include a settings 120 feature which allows the user to configure various features associated with the streaming device, e.g., audio setting, display setting, account setting, etc. It should be understood that the home menu 124 and user interface 112 may take on various forms and layouts, and this illustration is provided to show the interactive nature associated with the interface of the streaming device 106.

In some embodiments, the pass-through device 104 may enable cloud gaming for the user 102. As shown in FIG. 1, in one embodiment, the pass-through device 104 can connect to an input of the display screen 116 and the streaming device 106 can connect to an input of the pass-through device 104. When a user 102 interacts with the user interface 112 of the streaming device 106, the user may have an option of selecting a video game or an application associated with the video game (e.g., PlayStation™ Now 118*a*, or other video game accessing application) which can initiate a game session or generate a signal requesting imitation of a game session. If a video game or an application associated with the video game is selected, the pass-through device 104 is activated and a signal is sent to the cloud computing and gaming provider 114 which initiates or causes a request to begin the processing of the selected video game.

In one embodiment, the cloud computing and gaming provider 114 maintains and executes the video game played by the user 102. In some embodiments, the cloud computing and gaming provider 114 is configured to receive inputs from a controller 108 operated by a user 102 over the network 112. As the user 102 interacts with the video game, the user provides inputs via the controller 108 and game commands are sent to the cloud computing and gaming provider 114. In some embodiments, the cloud computing and gaming provider 114 is configured to process the inputs to affect the game state of the executing video game. The output from the executing video game, such as video data, audio data is compressed and transmitted to the pass-through device 104 for decoding. In some embodiments, the pass-through device 104 is configured to receive and to decode the compressed stream of the video game. In one embodiment, the video game stream can be presented to the user 102 on the display screen 116 and/or a separate device such as a monitor or television.

In some embodiments, the pass-through device 104 can operate without connecting the streaming device 106 to the pass-through device 104. In one embodiment, when the pass-through device 104 is connected to the display screen 116, a user interface 112 associated with the pass-through device 104 is displayed on the display screen. In one embodiment, the user interface 112 associated with the pass-through device 104 may include a game catalog application that provides the user with a listing of video games that are available for cloud gaming. For example, if a user decides to detach the streaming device 106 from the pass-through device 104, a user interface associated with the pass-through device 104 would appear on the display instead of the user interface associated with the streaming device 106. In this way, the pass-through device 104 is configured to operate independently without connecting a streaming device 106 to the pass-through device 104. In other words, cloud gaming is still accessible by the user even if the pass-through device 104 is connected to the display screen 116 without having a streaming device 106 connected the pass-through device.

Figure 2:
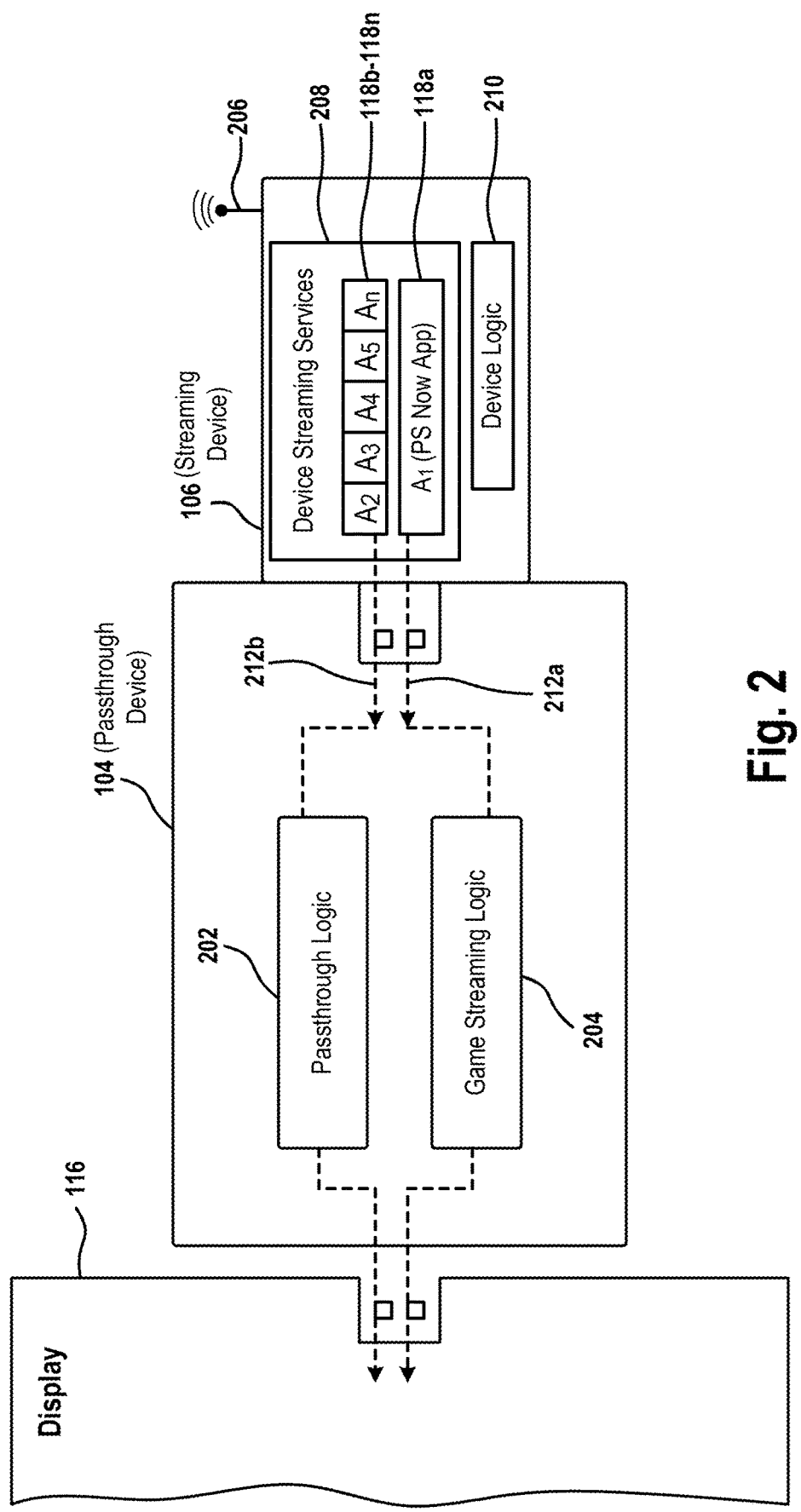
FIG. 2 illustrates an embodiment of a pass-through device and a streaming device that is connected to a display screen for facilitating cloud gaming and for streaming media content, in accordance with an implementation of the disclosure.

FIG. 2 illustrates an embodiment of a pass-through device 104 and a streaming device 106 that is connected to a display screen 116 for facilitating cloud gaming and for streaming media content. In some embodiments, the pass-through device 104 can be integrated with a streaming device 106 to provide a user with access to video games on a cloud gaming system. As illustrated in FIG. 2, an HDMI output port of the pass-through device 104 is connected to an HDMI input port of the display screen 116, and an HDMI output port of the streaming device 106 is connected to an HDMI input port of the pass-through device 104.

In one embodiment, the streaming device 106 may include an antenna 206, device streaming services 208 and device logic 210. In one embodiment, the antenna 206 is configured to provide wireless Internet access. In some embodiments the device streaming services 208 of the streaming device 106 may provide the user 102 with access to a various content via the plurality of applications 118*a*-118*n*. In one embodiment, the applications 118*a*-118*n* may include content such as video games, movies, sports, music, live TV, etc. In some embodiments, the device logic 210 is configured to process data received from the servers of the device streaming services 208. In one embodiment, the device logic 210 is configured to determine and decipher which one of the applications 118*a*-118*n* is selected by the user. In response to the selected application 118, the device logic 210 sends a signal to the corresponding device streaming service provider to request a video stream of the selected content.

For example, a user 102 may select an application 118 to watch a movie in which a request is sent to the corresponding device streaming service provider for a stream of the movie. The stream of the movie is then transmitted and received by the streaming device 106 for decoding which can be displayed on the display screen 116. In another embodiment, the user 102 may select a video game (e.g., PSNow™ Application) to initiate a gaming session in which a request is sent to the cloud computing and gaming provider 114 for a stream of the selected video game.

As illustrated in FIG. 2, if the user 102 selects the PlayStation Now 118a application or a video game to initiate a gaming session, a first HDMI signal 212a is transmitted from the streaming device 106 and received by a game streaming logic 204 of the pass-through device 104 for processing. In one embodiment, the selection of the PlayStation Now 118a application or a video game activates the pass-through device 104 in which the game streaming logic 204 of the pass-through device 104 receives and processes the first HDMI signal 212a. In one embodiment, the first HDMI signal 212a may include a compressed stream of the video game which can be decoded by the game streaming logic 204 and provided to the display screen 116 for rendering of the selected video game.

As further illustrated in FIG. 2, if the user 102 selects an application that does not include a cloud gaming video game (e.g., Netflix™, Hulu™, Amazon™ Prime Video, etc.), a second HDMI signal 212b is transmitted from the streaming device 106 and received by a passthrough logic 202 of the pass-through device 104. In one embodiment, the second HDMI signal 212b may include a compressed stream of the media content that was selected by the user. Since the second HDMI signal 212b is through the passthrough logic 202, the pass-through device 104 is not activated which results in the second HDMI signal 212b being untouched as if the streaming device 106 was not connected to the pass-through device 104. In other words, the passthrough logic 202 would allow the second HDMI signal 212b to pass through without any processing by the pass-through device 104. In this embodiment, users can interact with their streaming device 106 as they would traditionally as if the pass-through device 104 was not present. Once the second HDMI signal 212b is received by the display screen 116, the display screen can render use the selected media content.

In some embodiments, the pass-through device 104 may include a high-resolution upscaling module. In one embodiment, the high-resolution upscaling module is configured to receive an HDMI signal from the streaming device 106 for processing to generate a higher resolution output of the HDMI signal. In one embodiment, the high-resolution upscaling module may incorporate an artificial intelligence algorithm that is configured to use the HDMI signal to predict a higher resolution output. For example, the HDMI signal from the streaming device may be a movie in 1080p resolution. When the high-resolution upscaling module receives the HDMI signal, the module is configured to convert the HDMI signal to a higher quality such as a 4K resolution.

Figure 3:
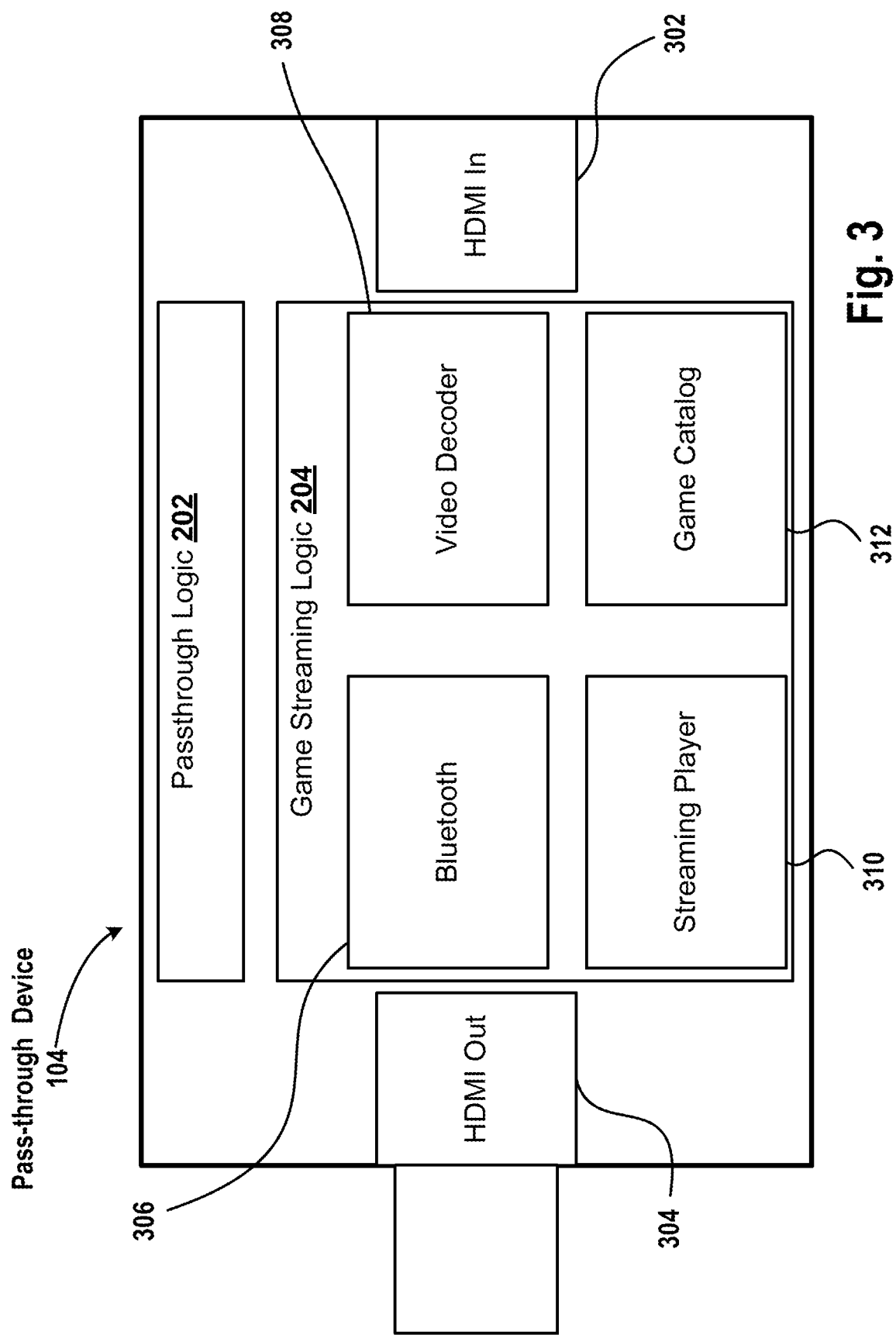
FIG. 3 illustrates an embodiment of a pass-through device, in accordance with an implementation of the disclosure.

FIG. 3 illustrates an embodiment of a pass-through device 104, in accordance with an implementation of the disclosure. In one embodiment, the pass-through device 104 includes an HDMI input port 302, an HDMI output port 304, a pass-through logic 202, and a game streaming logic 204. In one embodiment, the HDMI output port 304 of the pass-through device 104 can be connected to an HDMI input port of the display screen 116. In another embodiment, an output of a streaming device 106 such as an Apple™ TV, Roku™, FireTV™, cable box, Blue-ray player, etc. can be connected to the HDMI input port 302 of the pass-through device 104. Accordingly, existing streaming devices that are owned or preferred by the user 102 can be integrated with the pass-through device 104 to provide the user 102 with access to a video games from a cloud gaming system.

In some embodiments, during the operation of a media application that is not associated with a video game that is streamed from a cloud gaming system, e.g., Movies, Music, live TV, etc., an HDMI signal of the media content passes through the passthrough logic 202. In one embodiment, when the HDMI signal passes through the passthrough logic 202, the pass-through device 104 remains inactive and the streaming device 106 operates without any interruption by the pass-through device 104. In other words, the streaming device 106 operates as if the pass-through device 104 and streaming device 106 are not connected. In other embodiments, the passthrough logic 202 may process the data associated with the HDMI signal. For example, the user 102 may be using the streaming device 106 to watch live TV. The HDMI signal may include data that indicates that the user 102 typically watches college basketball, and hockey in the evenings. Accordingly, the data that is received by the passthrough logic 202 can be processed to determine user behavior and to determine the type of media content that the user may have an interest in viewing.

In some embodiments, when an application associated with a cloud gaming video game is selected by the user, the pass-through device 104 is activated which results in the HDMI signal passing through the game streaming logic 204 for processing by the game streaming logic 204. In one embodiment, when the pass-through device 104 is activated, the pass-through device 104 is configured to connect and communicate with the cloud computing and gaming provider 114. In one example, the game streaming logic 204 may include a plurality of operations that are configured to support cloud gaming such as a Bluetooth module 306, a video decoder 308 operation, a streaming player 310 operation, and game catalog 312. In one embodiment, the Bluetooth module 306 may enable wireless connection to various types of devices. For example, the Bluetooth module 306 may allow a controller 108 of the user 102 to connect wirelessly with the pass-through device 102.

In one embodiment, the video decoder 308 operation may be configured to decode the compressed stream of the video game for rendering the decompressed video images for display on the display screen 116. In some embodiments, the video decoder 308 may include an operation for storing individual video frames in a receive buffer of the pass-through device 104. In some embodiments, the streaming player 310 operation may be configured to communicate with the cloud computing and gaming provider 114 to request the video game selected by the user 102. For example, when the user 102 makes a selection of a video game through a user interface associated with a streaming device, the cloud computing and gaming provider 114 automatically begins streaming the selected video game to the pass-through device 104.

In one embodiment, the game catalog 312 may serve as the primary user interface for the user 102. For example, if the streaming device is disconnected or detached from the pass-through device, the pass-through device is configured to operate independently without the streaming device. In this embodiment, a user interface associated with the pass-through device may include a game catalog 312 application that is selectable by the user.

Figure 4:
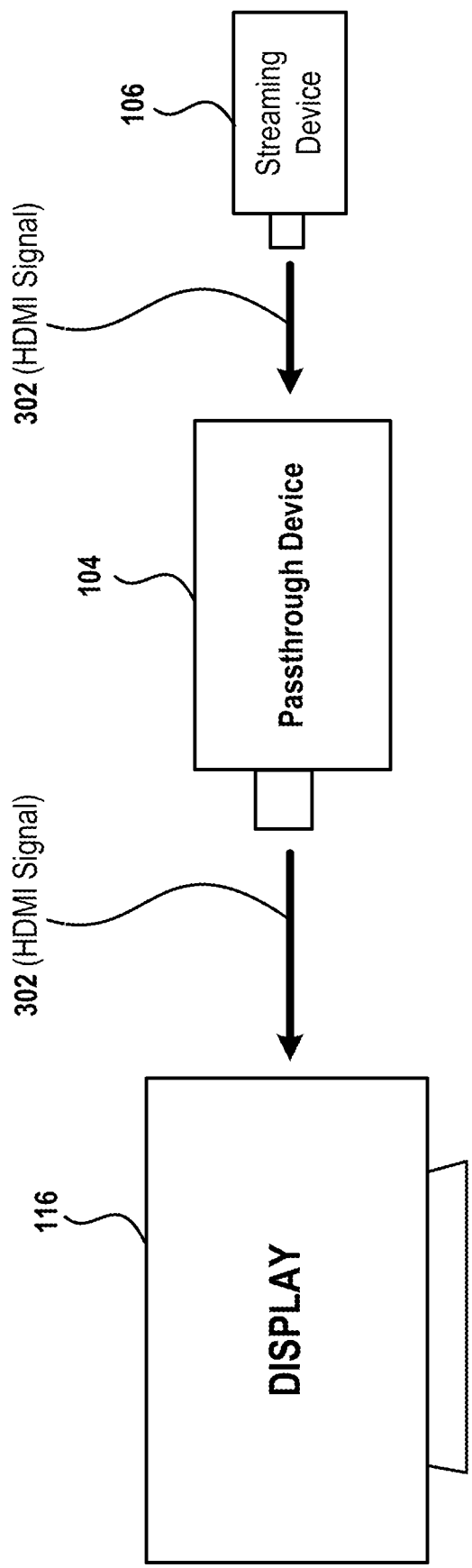
FIG. 4 illustrates an embodiment of an HDMI signal flowing from a streaming device into a pass-through device and a display screen when the pass-through device is not activated, in accordance with an implementation of the disclosure.

FIG. 4 illustrates an embodiment of an HDMI signal 302 flowing from a streaming device 106 into a pass-through device 104 and a display screen 116 when the pass-through device 104 is not activated. In one embodiment, the streaming device 106 may be a device such as an Apple™ TV, Roku™ media player, FireTV™, etc. which is configured to receive a video stream of a media content (e.g., movie, music, live TV, etc.) that is selected by the user. In some embodiments, the streaming device 106 is configured to process the video stream and output the HDMI video signal 302. As shown in FIG. 4, the HDMI video signal 302 flows from the streaming device 106 and is received by the pass-through device 104. After the pass-through device receives the HDMI video signal 302, the HDMI video signal 302 flows to a display screen 116 such as a TV, monitor, projector, etc. which is processed and rendered by the display screen 116. In the illustrated example shown in FIG. 4, the HDMI video signal 302 flows through the pass-through device 104 uninterrupted. In the illustrated embodiment, a user can connect their existing streaming device 106 to the pass-through device 104 and continue to use their streaming device 106 as they previously have without any interference by the pass-through device 104.

In another embodiment, a selection of an application that is not associated with the video game (e.g., music, live TV, movies, etc.) causes the gaming session to be inactive (e.g., pass-through device 104 not activated). In some embodiments, this causes an HDMI signal 302 associated with the selected application to pass through a passthrough logic 202 uninterrupted for rendering by the display screen 116.

In one embodiment, turning on the display screen 116 would trigger the pass-through device 104 to provide power and turn on the streaming device 106. In one embodiment, when the streaming device 106 is turned on, the streaming device may generate an output HDMI video signal 302 which flows through the pass-through device 104 and to the display screen 116 which is processed and rendered by the display screen 116. As a result, the display screen 116 may include a user interface associated with the streaming device 106 and the user can view and interact with the plurality of applications that are available through the streaming device 106.

For example, a user 102 owns a Roku streaming device and the Roku streaming device is connected to a display screen 116 via a pass-through device 104. When the user 102 turns on the display screen 116, a user interface associated with the Roku streaming device is displayed and the user 102 can interact with one or more applications via the user interface, e.g., launching applications, watching videos, listening to music, etc. If the user wants to watch a movie using a movie application (e.g., Netflix™), the user can select the movie from the movie application. The selected movie will result in the streaming of the movie from the respective servers associated with the movie application. When the selected movie is streamed to the Roku streaming device and displayed on the display screen 116, the pass-through device 104 remains inactive and does not interfere with the video stream.

Figure 5:
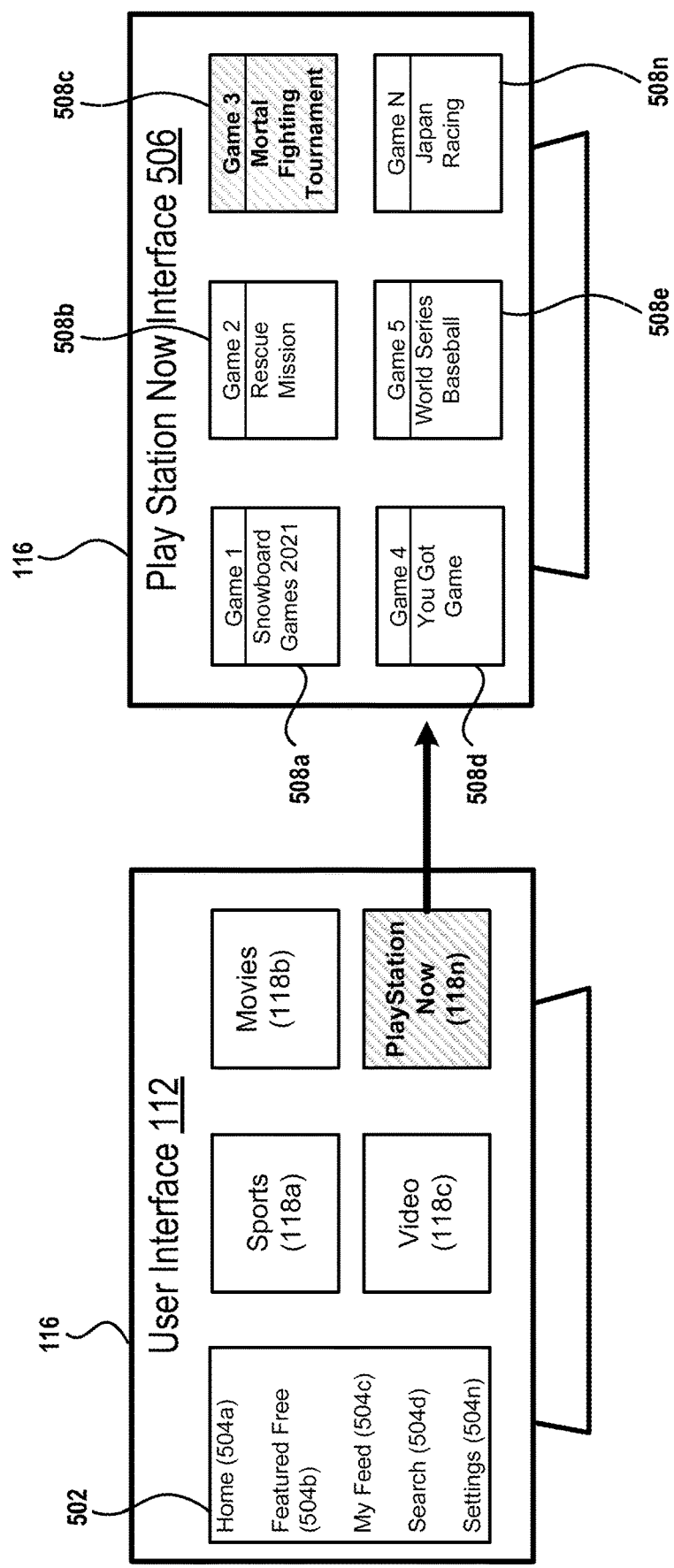
FIG. 5 illustrates an embodiment of a user interface of a streaming device and a corresponding PlayStation Now interface after a user selects a PlayStation Now application to initiate a gaming session, in accordance with an implementation of the disclosure.

FIG. 5 illustrates an embodiment of a user interface 112 of a streaming device 106 and a corresponding PlayStation Now interface 506 after a user 102 selects a PlayStation Now application 118n to initiate a gaming session. In one embodiment, the user interface 112 of a streaming device 106 (e.g., Roku streaming media player) is presented on a mobile phone of the user, a display screen 116, or any other device. In one embodiment, the device streaming services 208 may provide the user interface 112. In the illustrated example, the user interface 112 includes a plurality of applications 118a-118n. As illustrated, the applications may include a sports application 118a, a movies application 118b, a video application 118c, and a PlayStation™ Now application 118n. In other embodiments, the user interface 112 may include a menu 502 that includes plurality of categories 504a-504n. It should be understood that the user interface 112 may take on various forms and layouts, and this illustration is provided to show the interactive nature of a particular type of streaming device.

As further illustrated in FIG. 5, after the PlayStation™ Now application 118n is selected by the user 102, the selection of the PlayStation Now application 118n activates the passthrough device 104 and a PlayStation Now interface 506 is presented on the display screen 116 of the user. In some embodiments, the PlayStation™ Now interface 506 includes a plurality of video games 508a-508n that is presented to the user for selection. In one embodiment, the plurality of video games 508a-508n is stored and can be retrieved from a video game server associated with the cloud computing and gaming provider 114. In other embodiments, the plurality of video games 508a-508n is stored and can be retrieved from the game catalog 312 that is stored in the game streaming logic 204 of the pass-through device 104.

For example, as shown in FIG. 5, the PlayStation Now interface 506 includes six different video games 508a-508n (e.g., Snowboard Games 2021, Rescue Mission, Mortal Fighting Tournament, You Got Game, World Series Baseball, Japan Racing) that is selectable by the user. In some embodiments, when the user selects a video game 508 to begin a gaming session, the selection of the video game causes the activation of the pass-through device 104. The pass-through device 104 may begin receiving and processing a compressed stream of the selected video game from video game server associated with the cloud computing and gaming provider 114.

Figure 6:
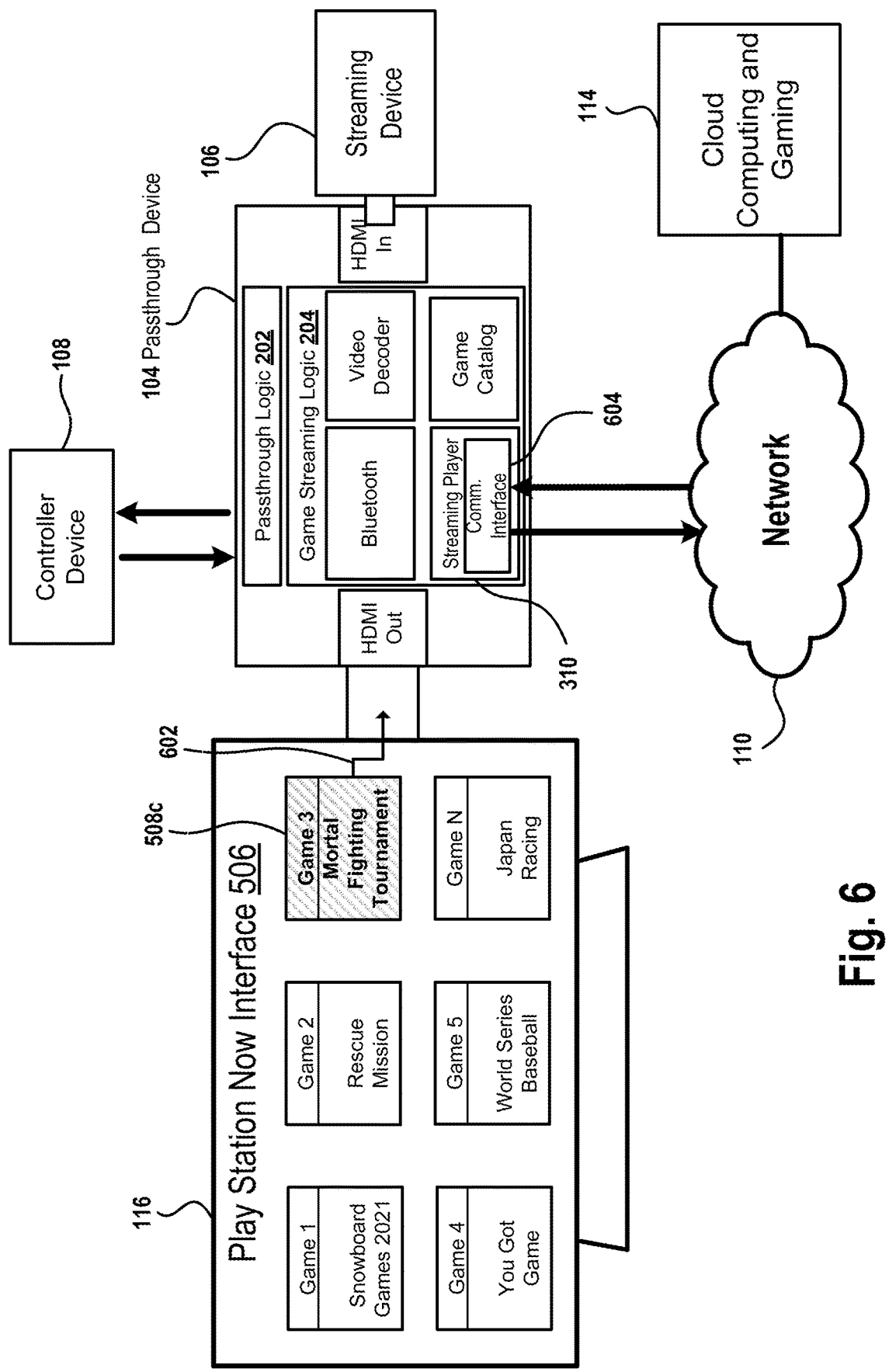
FIG. 6 illustrates an embodiment of a system that is configured to stream a video game that is selected by a user from a cloud computing and gaming provider, in accordance with an implementation of the disclosure.

FIG. 6 illustrates an embodiment of a system that is configured to stream a video game that is selected by a user from a cloud computing and gaming provider 114. As illustrated, the streaming device 106 is connected to a display screen 116 via the pass-through device 104. In one embodiment, after the user 102 makes a selection of a video game 508c (e.g., Mortal Fighting Tournament) through the PlayStation Now Interface 506 (or user interface 112) to begin a gaming session, the selection results in signal 602 being transmitted to the pass-through device 104 to cause the activation of the pass-through device 104. In some embodiments, the streaming player 310 operation of the pass-through device 104 includes a communication interface 604. In some embodiments, the communication interface 604 may include an operation that is configured to facilitate communication with the cloud computing and gaming provider 114 over the network 110.

For example, when the user selects a video game, the communication interface 604 may be configured to communicate with the cloud computing and gaming 114 which may include sending an indication to notify the cloud computing and gaming 114 that user requested a particular video game 508 for the gaming session. In response to the request, the cloud computing and gaming 114 transmits a compressed stream of the video game to the pass-through device 104 for decoding by the video decoder 308 operation of the pass-through device 104. In one embodiment, selection of the video game may cause the transmission of the compressed stream of the video game from a server of the cloud computing and gaming provider 114 to a receive buffer for decoding by the game streaming logic. This may help eliminate latency and delays that may occur during the transmission of the video game stream.

In some embodiments, as illustrated in FIG. 6, a controller 108 of the user 102 can connect to the pass-through device 104 wirelessly via the Bluetooth module 306 of the passthrough device 104. In one embodiment, the user may provide inputs via the controller 108 and game commands are sent to the cloud computing and gaming provider 114 for processing of the inputs.

Figure 7:
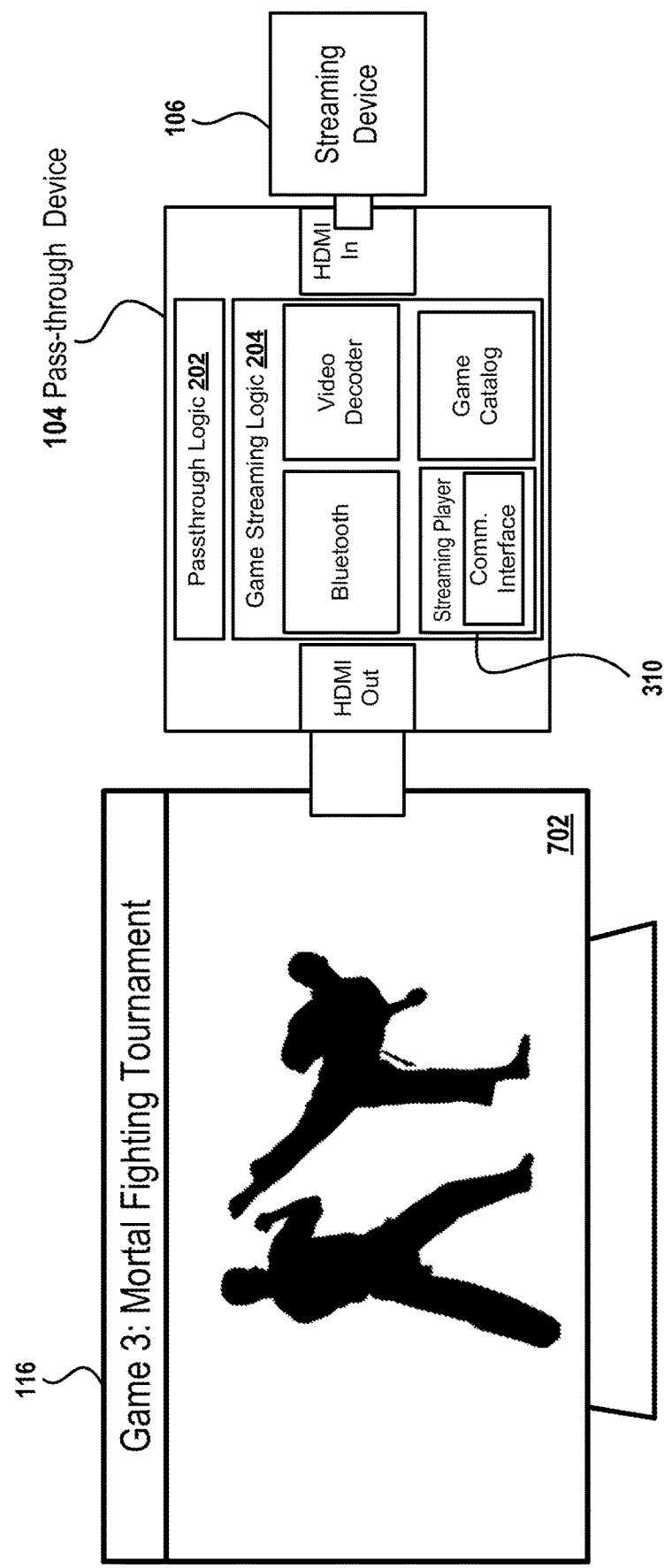
FIG. 7 illustrates an embodiment of streaming a selected video game from a cloud computing and gaming provider and displaying the selected video game on a display screen of the user, in accordance with an implementation of the disclosure.

FIG. 7 illustrates an embodiment of streaming a selected video game from a cloud computing and gaming provider 114 and displaying the selected video game on a display screen 116 of the user. In the embodiment shown in FIG. 7, the pass-through device 104 is connected to the display screen 116 and the streaming device 106 is connected to the pass-through device 104. In one embodiment, after a request is sent to the cloud computing and gaming 114 provider to begin a gaming session for the selected video game, the cloud computing and gaming 114 provider transmits the stream of the video game to the pass-through device 104 which is received and decoded. In one embodiment, after decoding the video game stream, the pass-through device 104 is configured to provide image data for rendering by the display screen 116.

In the illustrated example shown in FIG. 7, the display screen 116 is shown displaying a game scene 702 of a video game (e.g., Game 3: Mortal Fighting Tournament). In particular, the game scene 702 depicts a martial arts fight between a first fighter and a second fighter where the user 102 controls the game actions of the first fighter. In some embodiments, during the gameplay of the user, as the user provides input via the controller 108 to control the game actions of the first fighter, the inputs of the user is received by the pass-through device 104 which drives interactivity of the video game while the cloud computing and gaming 114 provider executes the video game.

In some embodiments, after the gaming session is concluded, the pass-through device 104 may be deactivated and the user interface 112 is displayed to the user on the display screen 116. In one embodiment, the user may initiate another gaming session by selecting a video game on the user interface 112 or an application 118 to view a particular type of media content provided by one more streaming entertainment services.

Figure 8:
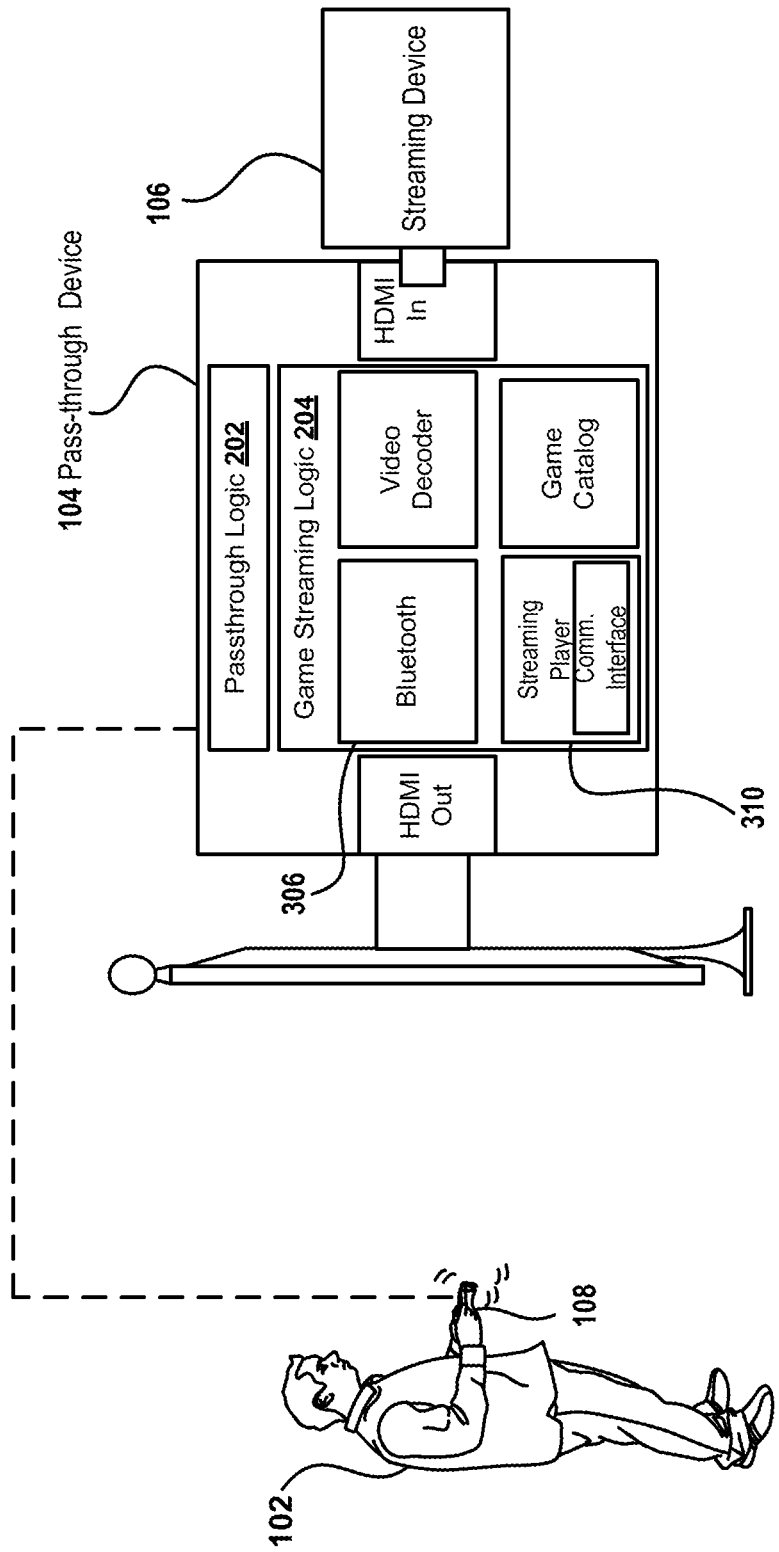
FIG. 8 illustrates an embodiment of a controller connected wirelessly to a pass-through device, in accordance with an implementation of the disclosure.

FIG. 8 illustrates an embodiment of a controller 108 connected wirelessly to a pass-through device 104. As noted above, in one embodiment, the pass-through device 104 may include a Bluetooth module 306 that enables wireless connection to various devices such as the controller 108. During the gameplay of the user, as the user provides input via the controller 108, the input is transmitted to the pass-through device 104 for processing by the game streaming logic 204 of the pass-through device 104 for driving interactivity of the video game. The input provided by the user 102 is further transmitted to the cloud computing and gaming 114 provider where the cloud computing and gaming 114 provider is configured to process the input to affect the game state of the executing video game.

In some embodiments, the controller 108 shown in FIG. 8 may include an input button (e.g., PSNow™ button) that is selectable by the user. In one embodiment, when the input button (e.g., PS Now button) is selected by the user, the pass-through device 104 is activated which may result in the video game servers transmitting the compressed stream of the video game to the pass-through device 104 for processing by the game streaming logic of the pass-through device 104. The PS Now button is, in one embodiment, a user interface selection icon that is selectable using a device.

Figure 9:
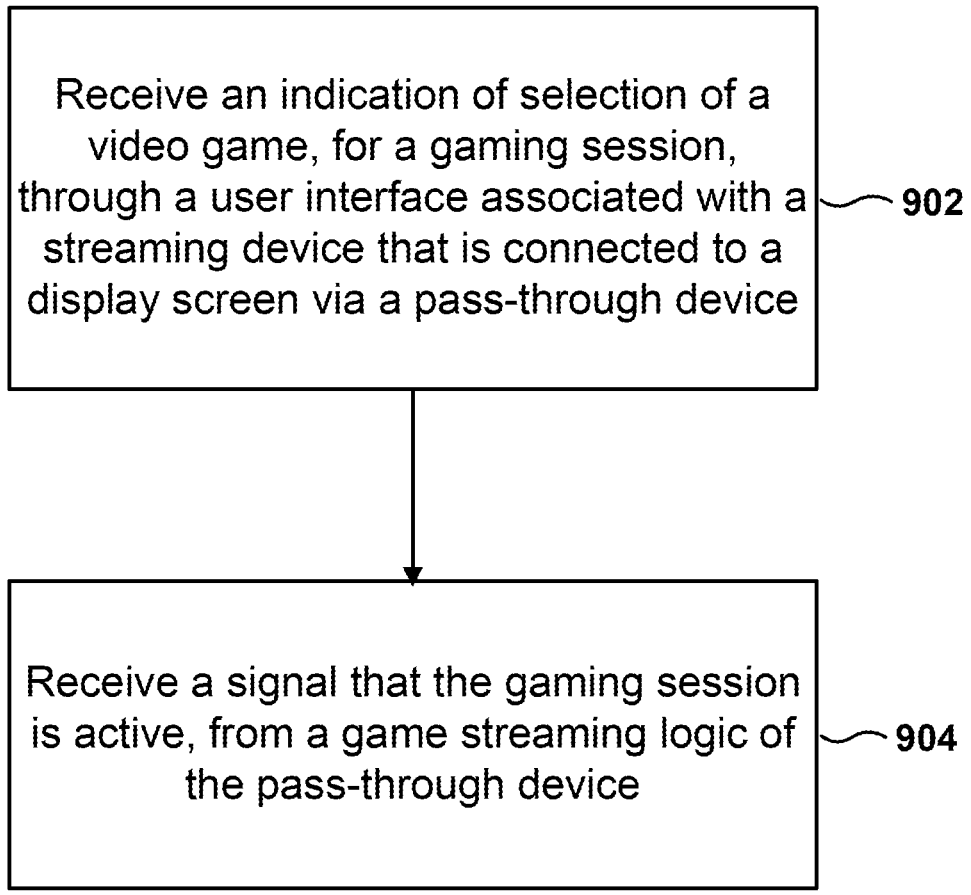
FIG. 9 illustrates a method for processing video games streamed from a cloud gaming system over a network, in accordance with an implementation of the disclosure.

FIG. 9 illustrates a method for processing video games streamed from a cloud gaming system over a network. In one embodiment, the method described in FIG. 9 provides a user with access to cloud gaming by integrating an existing streaming device 106 of a user with a pass-through device 104. In one embodiment, the method includes an operation 902 that is configured to receive an indication of selection of a video game, for a gaming session, through a user interface 112 associated with a streaming device 106 that is connected to a display screen 116 via a pass-through device 104. As noted above, the user interface may be displayed on a mobile device of the other or any other device such as a personal computer, a laptop, a tablet computer, a monitor and console/PC setup, a television and console setup, a peripheral device, a tablet, a thin client, a set-top box, a network device/appliance, etc.

In some embodiments, the streaming device 106 may be a media streaming device such as AppleTV, Roku™ streaming media player, Amazon™ FireTV Stick, Google™ Chromecast™, etc. When the streaming device 106 is connected to the pass-through device 104, the pass-through device 104 may include a plurality of operations that are configured to process and facilitate cloud gaming. In one embodiment, the streaming device 106 includes a corresponding device streaming service 208 which may provide the user with access to a plurality of applications 118 and the user interface 112. In some embodiments, the user interface 112 may include may various applications for accessing different types of streaming entertainment services, e.g., video games, music, movies, news, sports, TV shows, etc. In one embodiment, the selection of a video game or any other type of application may result in a signal being sent to the cloud gaming system or streaming entertainment service system to notify the respective system that an application has been selected by the user.

The method flows to operation 904 where the operation is configured to receive a signal that the gaming session is active, from a game streaming logic of the pass-through device. In one embodiment, operation 904 may include a gaming streaming logic 204 that is configured to receive a compressed stream of the video game. In some embodiments, the gaming streaming logic 204 may include a video decoder 308 operation that is configured to decode the compressed stream of the video game. After decoding the compressed stream of the video game, operation 904 is configured to provide the display screen 116 image data for rendering scenes of video game. In other embodiments, as the user plays the video game and provides input via the controller 106, operation 904 is configured to receive the input of the user for driving interactivity of the video game while the cloud gaming system executes said video game.

Figure 10:
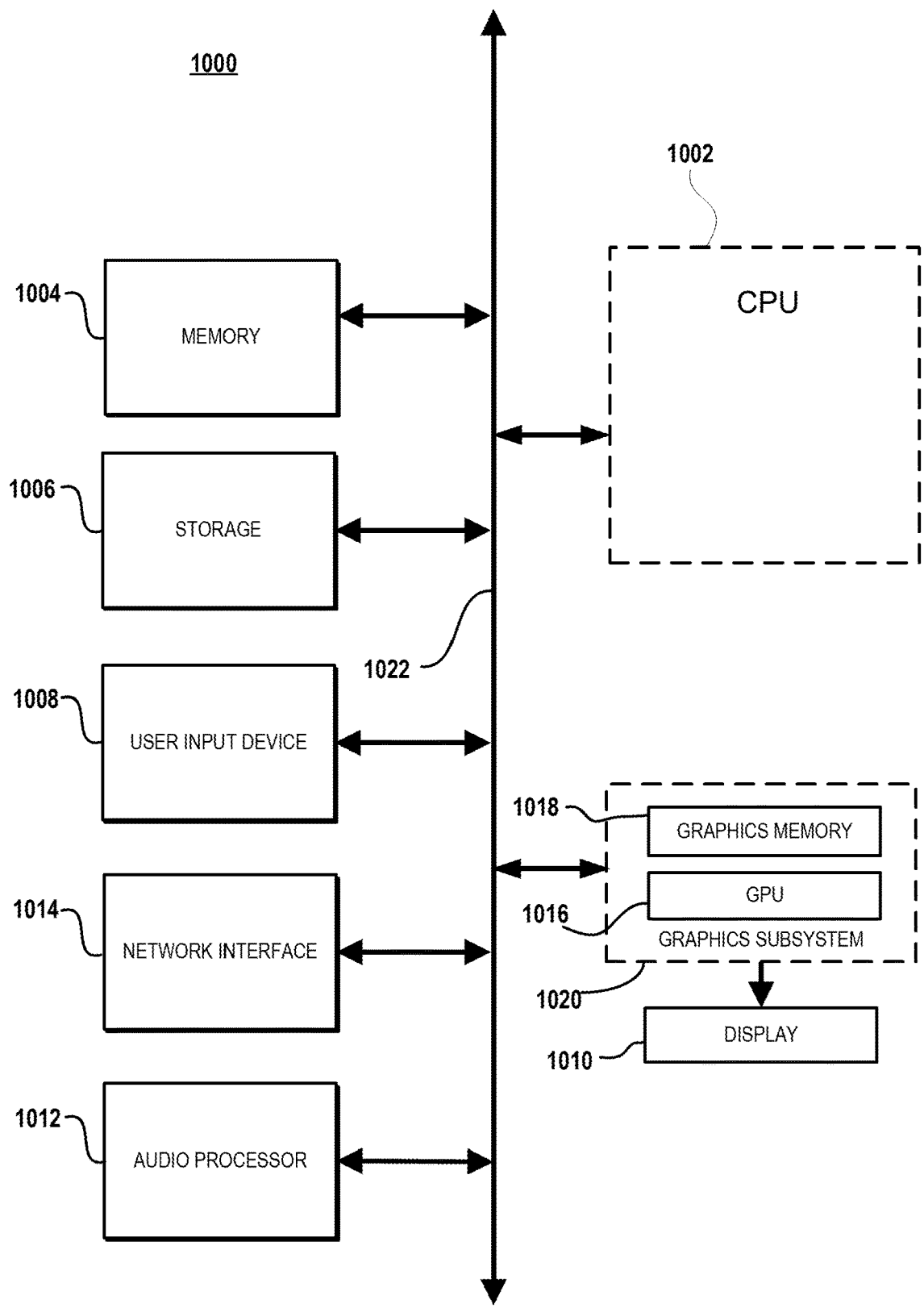
FIG. 10 illustrates components of an example device that can be used to perform aspects of the various embodiments of the present disclosure.

FIG. 10 illustrates components of an example device 1000 that can be used to perform aspects of the various embodiments of the present disclosure. This block diagram illustrates a device 1000 that can incorporate or can be a personal computer, video game console, personal digital assistant, a server or other digital device, suitable for practicing an embodiment of the disclosure. Device 1000 includes a central processing unit (CPU) 1002 for running software applications and optionally an operating system. CPU 1002 may be comprised of one or more homogeneous or heterogeneous processing cores. For example, CPU 1002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1000 may be a localized to a player playing a game segment (e.g., game console), or remote from the player (e.g., backend server processor), or one of many servers using virtualization in a game cloud system for remote streaming of gameplay to clients.

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to device 1000, examples of which may include keyboards, mice, joysticks, touch pads, touch screens, still or video recorders/cameras, tracking devices for recognizing gestures, and/or microphones. Network interface 1014 allows device 1000 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 1000, including CPU 1002, memory 1004, data storage 1006, user input devices 1008, network interface 1010, and audio processor 1012 are connected via one or more data buses 1022.

A graphics subsystem 1020 is further connected with data bus 1022 and the components of the device 1000. The graphics subsystem 1020 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1008, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from graphics memory 1018 to be displayed on display device 1010. Display device 1010 can be any device capable of displaying visual information in response to a signal from the device 1000, including CRT, LCD, plasma, and OLED displays. Device 1000 can provide the display device 1010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A pass-through device for streaming a video game from a cloud gaming system over a network, comprising:
    an HDMI output port;
    an HDMI input port;
    a passthrough logic; and
    a game streaming logic, the game streaming logic is activated responsive to selection of the video game from a user interface when using the pass-through device, the game streaming logic is configured to receive a compressed stream of the video game from the cloud gaming system, decode the compressed stream of the video game, and provide image data for rendering by a display screen, the game streaming logic provides a wireless connection for a controller usable for providing input to control the video game via the game streaming logic;
    wherein a selection of an application that is not associated with the video game causes an HDMI signal associated with the selected application to pass through the pass-through logic for rendering by the display screen, and said pass-through device remains inactive to not interfere with a video stream of the HDMI signal;
    wherein an HDMI output port of a streaming device connects to the HDMI input port of the pass-through device, wherein said streaming device produces said video stream.

2. The pass-through device of claim 1, wherein the HDMI output port of the pass-through device connects to an HDMI input port of the display screen.

3. The pass-through device of claim 1, wherein the user interface is rendered on a mobile device or the display screen having the pass-through device connected thereto.

4. The pass-through device of claim 1, wherein a server of the cloud gaming system transmits the compressed stream of the video game to a receive buffer of the pass-through device for decoding by a video decoder of the game streaming logic.

5. A pass-through device for streaming a video game from a cloud gaming system over a network, comprising:
    an HDMI output port;
    an HDMI input port;
    a pass-through logic; and
    a game streaming logic, the game streaming logic is activated responsive to selection of the video game from a user interface when using the pass-through device, the game streaming logic is configured to receive a compressed stream of the video game from the cloud gaming system, decode the compressed stream of the video game, and provide image data for rendering by a display screen, the game streaming logic provides a wireless connection for a controller usable for providing input to control the video game via the game streaming logic;
    wherein a selection of an application that is not associated with the video game enables a video stream produced by a streaming device to pass through the passthrough logic for rendering by the display screen, and said pass-through device remains inactive without interruption by the pass-through device;
    wherein an HDMI output port of the streaming device connects to the HDMI input port of the pass-through device.

6. The pass-through device of claim 5, wherein the pass-through device further comprises a high-resolution up-scaler, said high-resolution up-scaler is configured to receive an HDMI signal from a streaming device for processing to generate a higher image quality of the HDMI signal.

* * * * *